United States Patent

[11] 3,532,102

| [72] | Inventor | Eugene A. Glassey<br>Los Altos, California (c/o Exactel Instrument Co., 89 Pioneer Way, Mountain View, California 94040) |
|---|---|---|
| [21] | Appl. No. | 717,890 |
| [22] | Filed | April 1, 1968 |
| [45] | Patented | Oct. 6, 1970<br>Continuation-in-part of application Ser. No. 471,136, July 12, 1965, now Patent No. 3,377,869. |

[54] BLENDING CONTROL SYSTEM
8 Claims, 6 Drawing Figs.

[52] U.S. Cl.......................................................... 137/91, 137/92, 137/93

[51] Int. Cl........................................................... G05d 11/06, G05d 11/08, G05d 11/12

[50] Field of Search................................ 137/2—5, 87—89, 91—93; 73/452, 453

[56] References Cited
UNITED STATES PATENTS

| 1,450,023 | 3/1923 | Edelman................... | 137/91X |
|---|---|---|---|
| 2,362,661 | 11/1944 | Peters et al............... | 137/4X |
| 2,593,825 | 4/1952 | Albrecht................... | 137/93 |
| 2,896,656 | 7/1959 | Allen et al................ | 137/92 |
| 2,977,199 | 3/1961 | Quittner.................. | 137/3X |
| 3,004,544 | 10/1961 | Guptill..................... | 137/91X |
| 3,361,150 | 1/1968 | Horner..................... | 137/93 |
| 3,415,264 | 12/1968 | Brown et al.............. | 137/92 |

FOREIGN PATENTS

| 688,642 | 3/1953 | Great Britain............ | 137/93 |

Primary Examiner—Clarence R. Gordon
Assistant Examiner—David J. Zobkiw
Attorney—Julian Caplan ABSTRACT: A blending system controls volume of admission of one of two liquids into a mixing chamber so that the blended product is controlled to any of a number of parameters, e.g., density, consistency, pH. A sensor which has a voltage output proportional to the parameter sensed is installed in the discharge line. The voltage is mixed with a manually adjustable voltage from a fixed source amplified and used to drive a servomotor. The servomotor controls a valve governing admission of one additive to the mixing chamber.

Patented Oct. 6, 1970

INVENTOR.
EUGENE A. GLASSEY
BY
Julian Caplan
ATTORNEY

Patented Oct. 6, 1970
3,532,102
Sheet 2 of 2
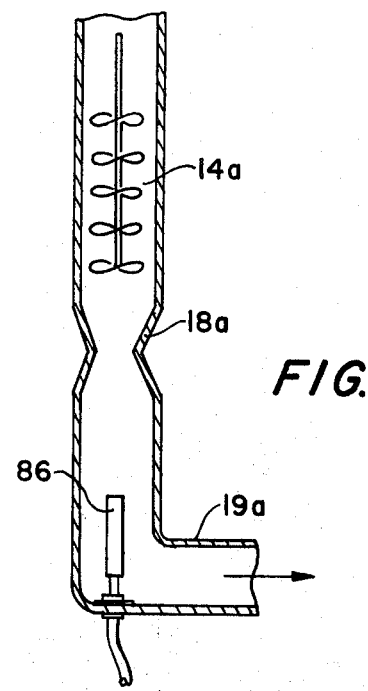
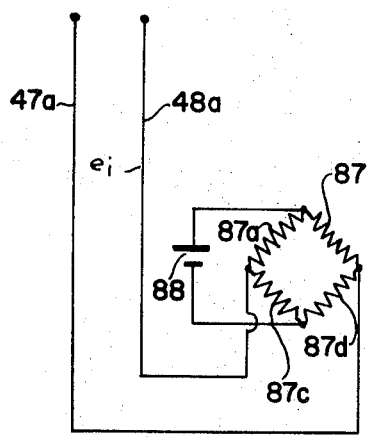
FIG. 2.
FIG. 2A.
FIG. 3.
FIG. 4A.
FIG. 4.
INVENTOR.
EUGENE A. GLASSEY
BY Julian Caplan
ATTORNEY

BLENDING CONTROL SYSTEM

This application is a continuation-in-part of my co-pending application U.S. Ser. No. 471,136 filed July 12, 1965 now U.S. Pat. No. 3,377,869.

This invention relates to a new and improved blending control system. More particularly, the invention relates to controlling the volume of flow of one of two ingredients which are mixed to form a blended liquid. A feature of the invention is that it provides means for blending such liquids in a closed system so that the blended output may be controlled to a wide variety of parameters.

Essentially, the system comprises several standard modules which may be used to control the blend to a variety of parameters. Thus a sensor is installed in the output line to sense one of the various desired parameters of the output liquid such as, for example, the specific gravity thereof. A characteristic of the sensor is that it furnishes an output voltage which is proportional to the parameter sensed. A second module comprises a potentiometer manually adjustable to control the output and having associated therewith a servomechanism. A third module comprises a valve controlling the input of one of the additives making up the blended liquid which is controlled by the servomechanism mentioned. In a preferred system, the valve is pneumatically actuated and the servomechanism controls a pressure regulator for the valve actuator.

A particular feature of the present invention is the fact that the materials involved in the blending are totally enclosed and this enables the system to be used with a variety of liquids not heretofore successfully handled by other techniques in which the materials come in contact with the atmosphere. Liquids which are deleteriously affected by contact with the air or those which are harmful when released into the atmosphere may be controlled.

As has been mentioned, a typical application of the present invention is in connection with a submerged density sensing instrument. However, other suitable sensors having proportional voltage output may be used, such as those measuring pH, consistency, viscosity, conductivity, suspended solid content, and other parameters.

Essentially the invention relates to a modular system for blending control, wherein there are three principal modules:

1. A sensor which senses a particular physical or chemical parameter of a blended material comprising a blend of two separate materials mixed in a chamber with which the sensor is associated, the sensor having as its output a voltage proportional to the parameter being sensed. The materials may be liquids, slurries and mixtures thereof. The parameter sensed may be of a wide variety, such as density, pH, consistency, viscosity, conductivity, suspended solid content, ionization, etc.

2. A blendor control which receives and amplifies the output voltage of the sensor, nulling the same against the voltage from a variable control.

3. A valve regulating input of at least one of the materials into the blending chamber and a control for the valve which is responsive to the blendor control, more specifically a servomotor which responds to the nulling of the blendor control to indirectly move the valve closure.

Other objects of the present invention will become apparent upon reading the following specification and referring to the accompanying drawings in which similar characters of reference represent corresponding parts in each of the several views.

In the drawings:

FIG. 2 is a view similar to FIG. 1 showing the system used to control consistency.

FIG. 2A is a schematic diagram of electrical elements of FIG. 2.

FIG. 3 is a view similar to FIG. 1 showing the system used to control pH.

FIG. 4 is a view similar to FIG 1 showing the system used to control density.

FIG. 4A is a schematic diagram of electrical elements of FIG. 4

Figure 1:
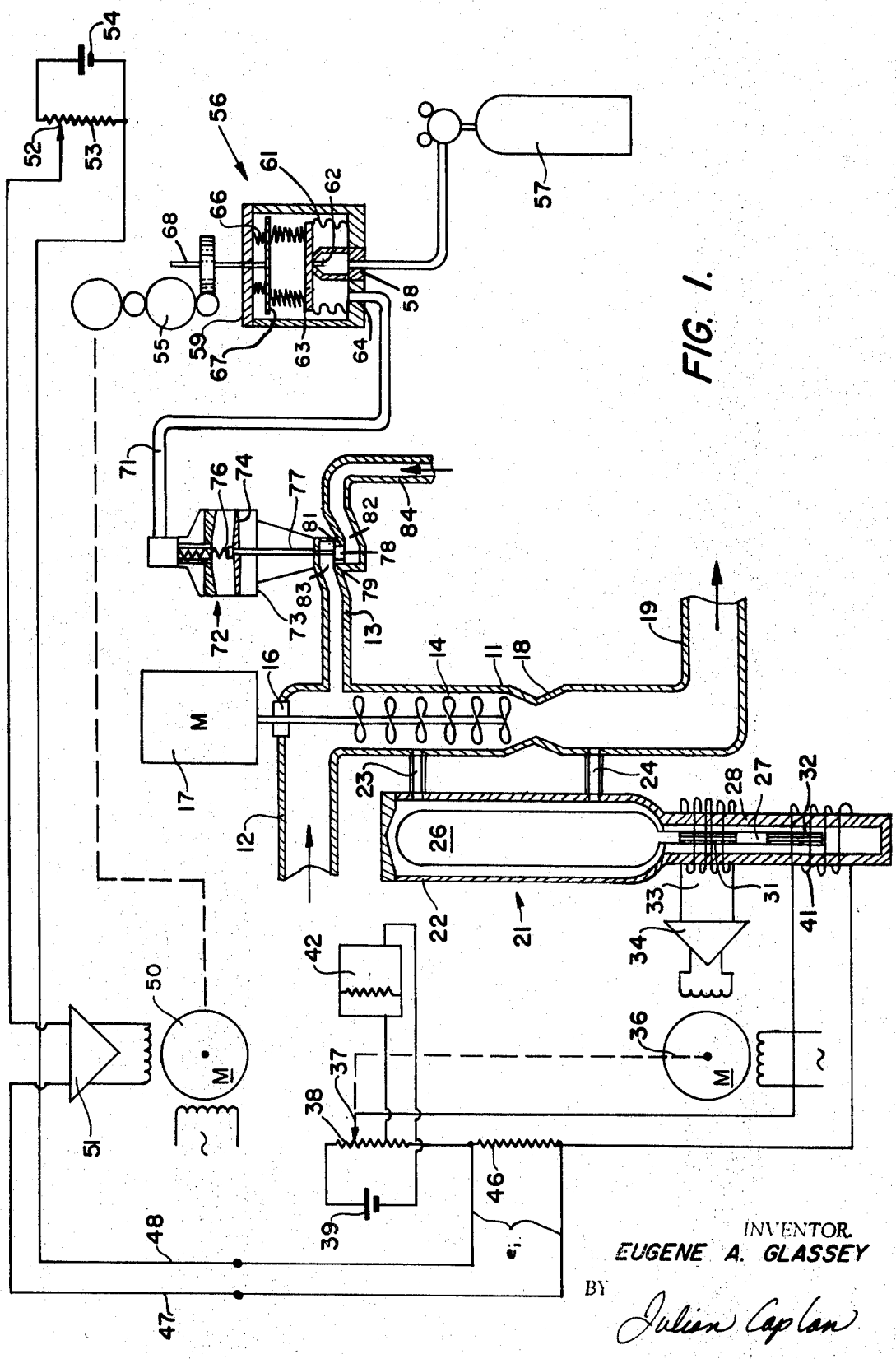
FIG. 1 is a schematic diagram partly broken away in section showing the invention adapted to controlling density.

Essentially, the system comprises means for controlling the admission of one of two materials which are blended together. As shown schematically in FIG. 1, a mixing chamber 11 is provided having an input pipe 12 for one material and an input pipe 13 for another material. In the chamber 11 is a stirring rod 14 having its shaft extending externally through gland 16 and turned by motor 17. Below chamber 11 there is preferably provided a constriction 18 which causes a pressure differential across orifices 23, 24 so that a sample will pass through sensor 21. The liquids entering through pipes 12 and 13 are different and their relative volume of inflow determines the characteristics of the product discharged through outlet conduit 19.

In FIG. 1, control of density is accomplished. Reference is made to co-pending patent applications U.S. Ser. Nos. 471,136 filed July 12, 1965 and 559,651 filed May 31, 1966, now U.S. Pat. Nos. 3,377,869 and 3,407,666, respectively, showing submerged hydrometer-type density sensing instruments. Details of construction of this sensor are set forth in said applications. Essentially, however, the density sensor 21 comprises a casing 22 connected by pipes 23, 24 to the output of casing 11 above and below constriction 18. The casing 22 is continuously filled with liquid and the liquid is continuously replenished from the blended mixture so that the contents of casing 22 are always the same as the output of the blending chamber 11. Suspended in the liquid inside chamber 22 is a hydrometer bulb 26 which has an elongated depending stem 27 which fits inside a downward extension 28 of casing 22. The reaction of bulb 26 and stem 27 is dependent upon the density of the liquid within casing 22 except for the control hereinafter described. Stem 27 contains an upper magnetic armature 31 and a lower magnetic armature 32. Surrounding armature 31 are the windings of a differential transformer 33, the output of which is amplified by amplifier 34 and drives servomotor 36. Motor 36 mechanically controls the position of the slider 37 of a potentiometer 38 energized by DC source 39. The output of the potentiometer 38 energizes coil 41 surrounding core 32. The characteristic of the servomotor 36 is to null the output of the differential transformer by attracting or repelling core 32 relative to coil 41. As has been set forth in the aforementioned patent applications U.S. Ser. Nos. 471,136 and 559,651, the current through coil 41 is proportional to or a function of the density of the liquid blended in chamber 11 and discharged through conduit 19. Such current may be recorded on recorder 42 as a permanent record of the density. It will be understood that many modifications may be made in the structure of the density sensor which has been described, but a characteristic which is important to the practice of the present invention is that a voltage output $e_i$ which is proportional to the density is produced. In accordance with the wiring diagram of FIG. 1, this voltage is taken off through a shunt 46 through lead wires 47, 48. Wire 47 leads to a servoamplifier 51 and thence to the movable contact 52 of potentiometer 53 energized by a DC source 54. Potentiometer contact 52 is manually adjustable and the manual adjustment thereof determines the output density through conduit 19. Wire 48 leads directly to potentiometer 53.

The output of servoamplifier 51 drives second servomotor 50. Motor 50 drives a gear reduction train 55. The gear train 55 controls pressure regulator 56 which may be of a commercially available type well understood in the art and whose construction forms no part of the present invention. For purpose of illustration, it may be stated that a source 57 of gas under pressure (e.g., compressed air or nitrogen) is connected to the input 58 of regulator 56. Casing 59 contains a bellows 61 which carries valve stem 62 which moves toward and away from an orifice plate 63; the opening through which the source of pressure passes is controlled to maintain a constant pressure at outlet 64. Bellows 61 is biased toward orifice plate 63 by means of spring 66 which is mounted on a spring mounting plate 67 attached to lead screw 68 controlled by gear train 55.

The output 64 of regulator 56 is conveyed by pipe 71 to pneumatic actuator 72 which is also a commercially available device. Actuator 72 has a casing 73 in which moves a piston 74 biased by spring 76 as well as the pressure of the gas entering through pipe 71. Piston 74 carries a stem 77 on the lower end of which is a valve closure 78 which moves inside valve body 79 under the influence of movement of piston 74. Within body 79 is a seat 81 and to opposite sides of seat 81 are inlet port 82 and outlet port 83. Inlet port 82 is connected by pipe 84 to a source of second additive while outlet port 83 is connected by pipe 13 to the casing 11.

The operation of the device is as follows: Two liquids enter the blending chamber 11, namely, a first liquid entering through conduit 12 and an additive conveyed through conduit 84 past valve 79 and conduit 13. The opening and closing of valve piston 78 relative to seat 81 regulates the volume of the additive which enters the mixing chamber 11 and thus affects the density of the blend of the two liquids which leaves the mixing chamber. As has been mentioned, the apparatus of FIG. 1 controls density but as hereinafter appears, other parameters may be controlled by a suitable sensor. The sensor of FIG. 1 is a hydrometer bulb 26 which excites a differential transformer 33 as its position fluctuates dependent upon fluctuation in density and the differential transformer is nulled out by the servomotor 36 affecting the position of potentiometer slider 37 which in turn applies a varying current to a restoring coil 41 which moves the bulb 26. The current passing through coil 41 passes through shunt 46, producing signal voltage $e_t$, which is nulled against the voltage from manually controlled potentiometer 53 for a variety of different densities. The output of amplifier 51 drives servomotor 50 which controls pressure control 56 which in turn governs the opening of valve 79. Valve 79 regulates the flow of second additive into the mixing chamber.

In FIG. 2, another parameter of the blended liquids is controlled, namely consistency. The instrument 86 installed in discharge line is a sensor such as Fischer and Porter Consistency Regulator 16C3381 which is commercially available. The element 86 protruding into the conduit 19a deforms or shears the liquid flowing through the pipe and the force required to shear the liquid is measured as a function of consistency. Essentially, as shown in FIG. 2A, the element is a wheatstone bridge having resistances 87a, 87b, 87c and 87d, which are in effect the resistances of a strain gauge bridge. A source of DC current 88 is imposed on the bridge and the output wires 47a, 48a convey the voltage $e_t$ which is proportional to or a function of consistency. In other respects the elements of the device are the same as in FIG. 1 and the same reference numerals followed by the subscript $a$ are employed to represent corresponding parts.

In FIG. 3, the parameter measured is pH. An instrument such as a Beckman Instruments, Inc. Model 900pH Analyzer 91 is connected into the discharge of chamber 11b by pipes 23b, 24b. As the acidity or alkalinity of the liquid inside casing 91 changes, the characteristic of the instrument is that the resistance of an electrode 92 varies. This is represented schematically as the sliding of a contact of a potentiometer although the actual instrument is considerably more complex. The voltage of wires 47b, 48b $e_t$ is proportional to the acidity of the liquids and is used to control the inflow of the additive by essentially the same means as has been described with respect to FIGS. 1 and 2. The same reference numerals followed by the subscript $b$ are used to designate corresponding parts throughout.

FIG. 4 shows a sensor for material weight of a different type than that shown in FIG. 1. The output of chamber 11c is connected through flanges 102 to one leg of an elongated U-tube 101. The opposite leg of tube 101 is connected by flanges 103 to discharge conduit 19c. The middle of tube 101 is unsupported, and hence the tube sags under its own weight and that of its contents and the greater the density of the contents the greater the sag. The sag is measured by a strain gauge comprising resistor elements 104a—d attached to tube 101, as is well understood in the art. The schematic arrangement of the resistors in a wheatstone bridge circuit is shown in FIG. 4A. A source of DC current 106 is imposed on the bridge and the output wires 47c, 48c convey the voltage $e_t$ which is proportional to or a function of weight. In other respects, the elements of the device are the same as in FIG. 1 and the same reference numerals followed by the subscript $c$ are employed to represent corresponding parts.

I claim:

1. A blending control system of modular construction comprising a plurality of modules wherein at least one of said modules is interchangeable for adaptation of the system to perform a variety of functions each said module being separate from, and physically discrete with respect to, the other said modules, comprising:

a blending chamber 14, a first inlet conduit 12 and a second inlet conduit 13 for said chamber, a discharge conduit 19 for said chamber;

a sensor module means 21 for producing an electrical signal representing one parameter of blended materials in said blending chamber, said sensor module means comprising a sensor adapted to sense said parameter, a first source 39 of current for said sensor, said sensor varying the voltage output from said first source proportionally to the parameter being measured by said sensor 26 to produce said electrical signal;

an amplifier parameter control module comprising a servoamplifier 51, a servomotor 50 controlled by said servoamplifier, a second source 54 of electric current, adjustable means 53 for varying the voltage output from said second source, said servoamplifier 51 amplifying the voltage outputs of said sensor 21 $e_t$ and said second source 54 and driving said servomotor in a direction to null the differential of said voltage outputs;

a control module 72 comprising a valve 79 in said second inlet conduit for varying quantity flow through said second conduit, and valve control means 56 for said valve, said control means actuated by said servomotor 50 to adjust said valve to vary the parameter of the materials blended in said blending chamber to null said servoamplifier.

2. A system according to claim 1, in which said valve control means comprises a source of compressed gas, a pressure regulator for said source of compressed gas regulated by said servomotor, and a valve actuator connected to said valve and controlled by said pressure regulator.

3. A system according to claim 1, in which said adjustable means comprises a manually adjustable potentiometer, said second source connected across said potentiometer.

4. A system according to claim 1, in which said sensor is connected into said blending chamber and is totally enclosed and is totally isolated from atmosphere.

5. A system according to claim 1, in which said sensor senses density and comprises, a casing having an inlet and an outlet connected to said blending chamber, a bulb in said casing tending to vary in position depending on density of material in said casing, first and second armatures movable with said bulb, a differential transformer excited by the position of said first armature, a second servoamplifier for the output of said differential transformer, a second servomotor driven by the output of said second servoamplifier, a voltage regulator adjusted by said second servomotor, the output of said first source controlled by said voltage regulator, and a coil connected to said voltage regulator and in proximity to said second armature, said coil restoring said bulb to a position where said first armature is neutral relative to said differential transformer, said voltage output of said sensor dependent on the voltage through said coil.

6. A system according to claim 1, in which said sensor senses consistency and comprises a probe inserted in said discharge conduit and having an element which bends, the amplitude of bending dependent on consistency, a plurality of electrical resistances on said element each variable in resistance when stretched or compressed, said resistances electrically connected in a bridge circuit, said first source imposed across the bridge in one direction, said servoamplifier taking off the voltage output across said bridge in a different direction.

7. A system according to claim 1, in which said sensor senses pH and comprises an electrode subject to liquid in said discharge pipe which varies in resistance dependent upon acidity, said first source imposed across said electrode.

8. A system according to claim 1, in which said sensor senses weight and comprises a tube connected to said discharge conduit, said tube unsupported over a considerable portion of its length so that said tube sags proportional to the weight of its contents, a plurality of electrical resistances fixed to said tube each variable in resistance when stretched or compressed, said resistances connected in a bridge circuit, said first source imposed across the bridge in one direction, said servoamplifier taking off the voltage output across said bridge in a different direction.